(12) United States Patent
Wang et al.

(10) Patent No.: US 11,763,454 B2
(45) Date of Patent: Sep. 19, 2023

(54) PROCESSING A MEDICAL IMAGE

(71) Applicant: Siemens Healthcare GmbH, Erlangen (DE)

(72) Inventors: Puyang Wang, Baltimore, MD (US); Zhoubing Xu, Plainsboro, NJ (US); Sasa Grbic, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 92 days.

(21) Appl. No.: 16/815,439

(22) Filed: Mar. 11, 2020

(65) Prior Publication Data
US 2020/0311937 A1 Oct. 1, 2020

(30) Foreign Application Priority Data
Apr. 1, 2019 (EP) ..................................... 19166590

(51) Int. Cl.
| | |
|---|---|
| *G06T 7/00* | (2017.01) |
| *G06T 7/11* | (2017.01) |
| *G06N 3/08* | (2023.01) |
| *G06T 5/50* | (2006.01) |

(52) U.S. Cl.
CPC .............. *G06T 7/0014* (2013.01); *G06N 3/08* (2013.01); *G06T 5/50* (2013.01); *G06T 7/11* (2017.01); *G06T 2207/10072* (2013.01); *G06T 2207/10116* (2013.01); *G06T 2207/20084* (2013.01); *G06T 2207/30008* (2013.01)

(58) Field of Classification Search
None
See application file for complete search history.

(56) References Cited

U.S. PATENT DOCUMENTS

| | | | |
|---|---|---|---|
| 8,204,292 B2 | 6/2012 | Knapp et al. | |
| 10,079,071 B1 | 9/2018 | Lay et al. | |
| 2016/0328631 A1 | 11/2016 | Lay et al. | |
| 2017/0124432 A1* | 5/2017 | Chen | ................. G06F 40/30 |
| 2017/0262995 A1* | 9/2017 | Li | ................. G06N 3/0454 |
| 2017/0262996 A1* | 9/2017 | Jain | ................. G06K 9/4671 |
| 2017/0308770 A1* | 10/2017 | Jetley | ................. G06K 9/4671 |

(Continued)

OTHER PUBLICATIONS

Tiago Gonçalves, Isabel Rio-Torto, Luís F. Teixeira, Jaime S. Cardoso, "A survey on attention mechanisms for medical applications : are we moving towards better algorithms", arXiv:2204.12406v1 [cs.CV] Apr. 26, 2022.*

(Continued)

*Primary Examiner* — Jiangeng Sun

(57) ABSTRACT

Embodiments of the invention relate to a method of processing a medical image to remove one or more portions of the image corresponding to bone structures, the method comprising: receiving first image data representing a first, three-dimensional, medical image; processing the first image data to generate second image data representing a plurality of two-dimensional image channels each corresponding to a different slice of the first medical image; receiving the second image data at a neural network system; applying an attention mechanism at the neural network system to the second image data to generate an attention map representing one or more regions of interest; and determining, at least partly on the basis of the attention map, that one or more portions of the second image data represent a bone structure.

17 Claims, 3 Drawing Sheets

(56) References Cited

U.S. PATENT DOCUMENTS

2018/0053103 A1\* 2/2018 Delgado ............ G06K 9/00845
2018/0116620 A1 5/2018 Chen et al.
2018/0374209 A1 12/2018 Patil et al.

OTHER PUBLICATIONS

Cheng Chen et al., "Pairwise attention-enhanced adversarial model for automatic bone segmentation in CT images", 2023 Phys. Med. Biol. 68 035019.\*
Puyang Wang, Vishal M. Patel and Ilker Hacihaliloglu, "Simultaneous Segmentation and Classification of Bone Surfaces from Ultrasound Using a Multi-feature Guided CNN", arXiv:1806.09766v1 [cs.CV] Jun. 26, 2018.\*
Kosiorek, "Attention in Neural Networks and How to Use It," retrieved from the Internet at http://akosiorek.github.io/ml/2017/10/14/visual-attention.html, Oct. 28, 2019, 13 pgs.
Oktay et al., "Attention U-Net: Learning Where to Look for the Pancreas," Attention in Neural Networks and How to Use It, retrieved from the Internet at https://arxiv.org/pdf/1804.03999, Feb. 20, 2020.
Extended European Search Report dated Oct. 23, 2019, in connection with European Patent Application No. 19166590, 10 pgs.

\* cited by examiner

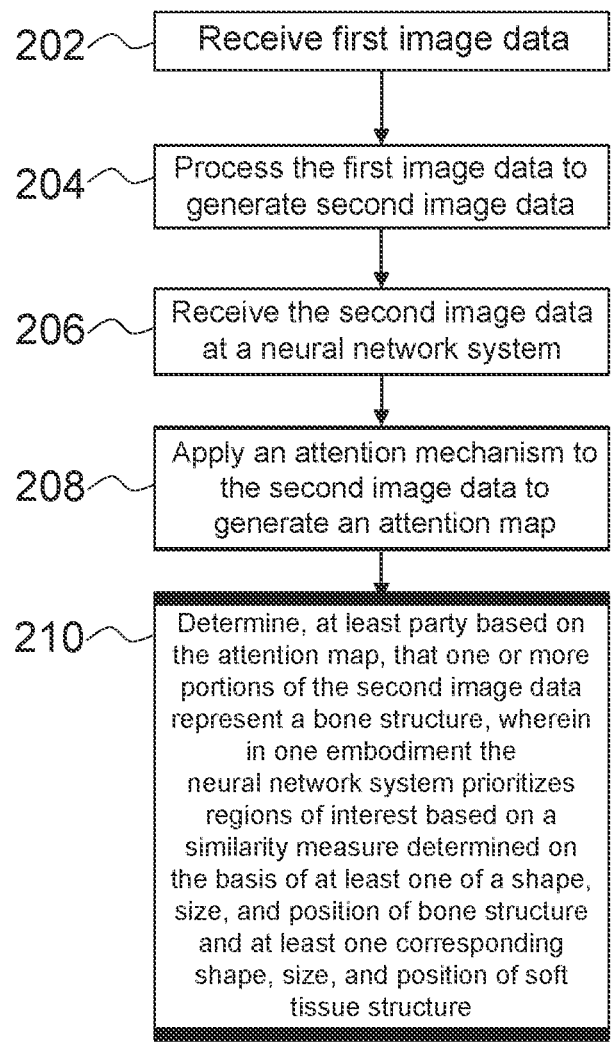

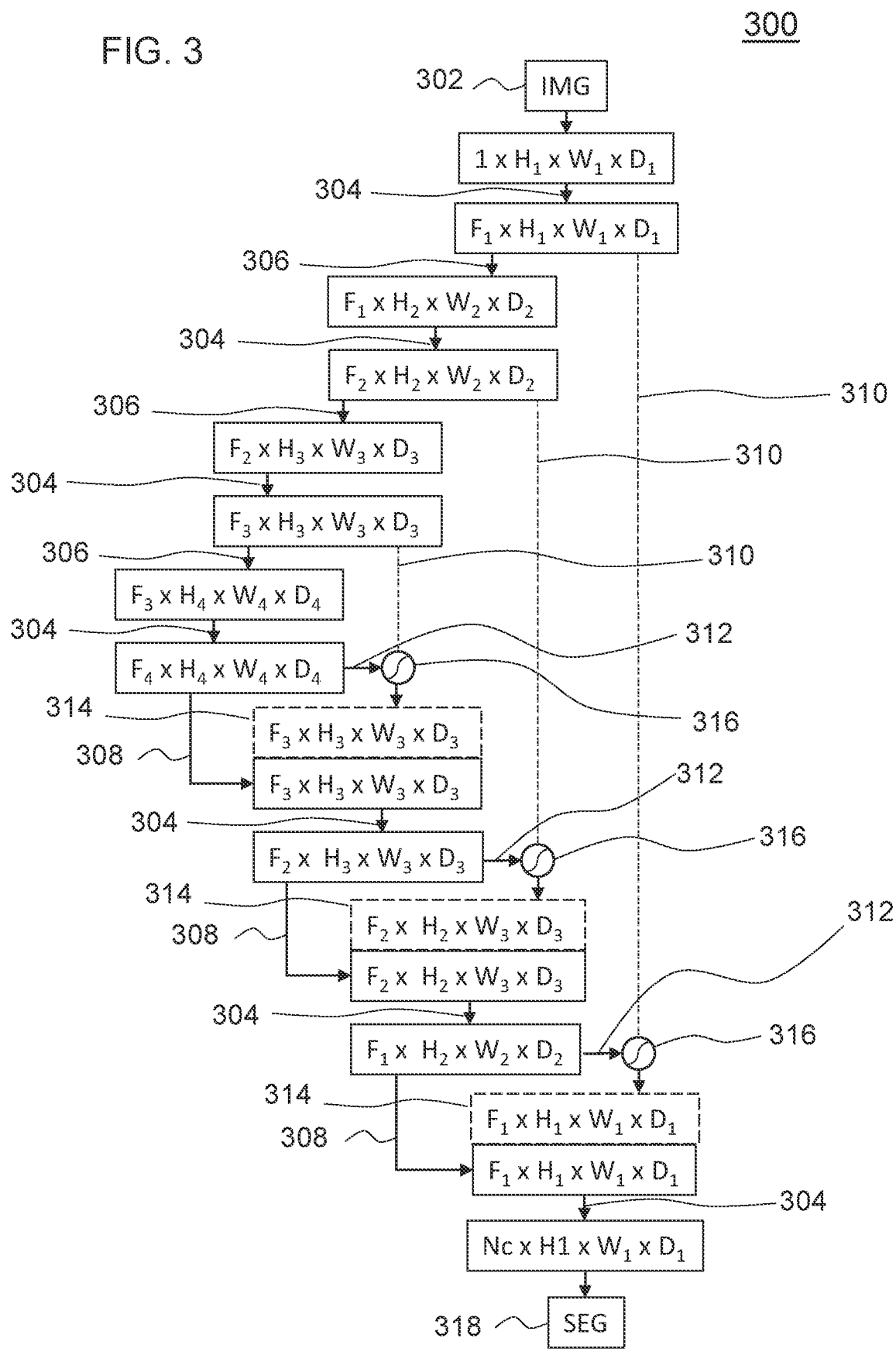

PROCESSING A MEDICAL IMAGE

CROSS-REFERENCE TO RELATED APPLICATIONS

This application claims priority from European Patent Application Serial No. 19166590.0, filed Apr. 1, 2019, the disclosure of which is incorporated herein by reference in its entirety.

TECHNICAL FILED

The invention relates to methods, apparatus and computer program products for processing a medical image to remove one or more portions of the image corresponding to bone structures.

BACKGROUND

In medical imaging, hard tissue such as bones (otherwise referred to as osseous tissue) can present challenges when trying to image and/or analyze the anatomy of soft tissue (otherwise referred to as non-osseous tissue) or corresponding pathology.

For example, computed tomography (CT) combines a series of X-ray images taken from different angles and uses computer processing to create cross-sectional images, or slices, of an object. The object may be, for example, a portion of a human or animal patient comprising bones, blood vessels and other soft tissues. The cross-sectional images, or slices, can be combined to generate three-dimensional computed volumes, commonly referred to as CT volumes. In one application of CT, referred to as computed tomography angiography (CTA), a contrast agent is injected into the bloodstream of the patient prior to imaging, in order to increase the contrast between the blood vessels of interest and other structures or background features. CTA volumes can be visualized using a volume rendering technique so that clinicians are able to see, for example, three-dimensional vascular structure, as well as diseases and other pathologies such as stenosis and aneurysms. However, soft tissue such as blood vessels may be occluded or obscured by hard tissue such as bones, teeth or calcification appearing in an image of the soft tissue of interest.

Accordingly, it is often desirable to remove portions of a medical image that represent hard tissue (e.g. bone) in order to better visualize features of underlying, nearby or surrounding soft tissue. For example, in CTA applications, it is desirable to remove bone structures from CT volumes to provide imagery comprising only vascular structures.

Conventionally, such removal of portions of images that represent hard tissue relies on manual editing techniques to extract and remove, for example, bone structures from the image data. However, such techniques require a significant amount of expertise and time, to the extent that throughput of the image processing may be too low to be practical in a clinical setting.

Attempts have been made to automate removal of bone structures from medical images. However, this task has proved challenging because many osseous and vascular structures have similar patterns in shape and contrast; that is blood vessels often tend to follow the skeletal structures which support them. Furthermore, image resolution and noise limitations in image data can result in an apparent connection between hard tissue and soft tissue that does not represent the real anatomy. This can create significant challenges for image processing systems arranged to perform automated removal of bone structures from the image data.

BRIEF SUMMARY OF THE INVENTION

These problems are solved or mitigated by the claimed method, data processing system, and computer program product.

The invention relates in one aspect to a method of processing a medical image to remove one or more portions of the image corresponding to bone structures, the method comprising:
  receiving first image data representing a first, three-dimensional, medical image;
  processing the first image data to generate second image data representing a plurality of two-dimensional image channels each corresponding to a different slice of the first medical image;
  receiving the second image data at a neural network system;
  applying an attention mechanism at the neural network system to the second image data to generate an attention map representing one or more regions of interest; and
  determining, at least partly on the basis of the attention map, that one or more portions of the second image data represent a bone structure.

One embodiment of the invention relates in one aspect to a method wherein the attention mechanism is arranged to determine, for a plurality of regions of the medical image, an attention measure indicating a degree of mixture of osseous and non-osseous tissue and, based on the attention measure, identify one or more regions of interest.

One embodiment of the invention relates in one aspect to a method wherein the neural network system is arranged to prioritize the one or more regions of interest based on a similarity measure determined on the basis of a shape and/or size and/or position of a bone structure and a corresponding shape and/or size and/or position of a soft tissue structure.

One embodiment of the invention relates in one aspect to a method comprising outputting, from the neural network system, output data indicating the determined one or more portions of the second image data.

One embodiment of the invention relates in one aspect to a method comprising processing the first image data and the output data to generate third image data representing a second medical image in which one or more portions of the first medical image determined to represent a bone structure are removed.

One embodiment of the invention relates in one aspect to a method wherein the neural network system comprises a deep neural network.

One embodiment of the invention relates in one aspect to a method wherein the deep neural network comprises one or more convolution neural networks.

One embodiment of the invention relates in one aspect to a method wherein the neural network system is arranged to perform a progressive filtering and down-sampling process on the second image data.

One embodiment of the invention relates in one aspect to a method wherein the determination that the one or more portions of the second image data represents a bone structure comprises classifying voxels of the three-dimensional medical image as bone or non-bone voxels.

The invention relates in one aspect to a data processing apparatus for processing a medical image to remove one or more portions of the image corresponding to bone structures, the data processing system comprising a processor arranged to:

receive first image data representing a first, three-dimensional, medical image;

process the first image data to generate second image data representing a plurality of two-dimensional image channels each corresponding to a different slice of the first medical image;

provide the second image data to a neural network system; and determine, using the neural network system, one or more portions of the second image data that represent a bone structure One embodiment of the invention relates in one aspect to a data processing apparatus arranged to apply an attention mechanism to the second image data to generate an attention map representing one or more regions of interest and determining the one or more portions of the second image data that represent a bone structure at least partly based on the attention map.

One embodiment of the invention relates in one aspect to a data processing apparatus wherein the attention mechanism is arranged to determine, for a plurality of regions of the medical image, an attention measure indicating a degree of mixture of osseous and non-osseous tissue and, based on the attention measure, identify one or more regions of interest.

One embodiment of the invention relates in one aspect to a data processing apparatus wherein the neural network system is arranged to prioritize identified regions of interest.

The invention relates in one aspect to a computer program, the computer program being loadable into a memory unit of a data processing system, including program code sections to make a data processing system execute the method according to an aspect of the invention when the computer program is executed in said data processing system.

The computer program product can be, for example, a computer program or comprise another element apart from the computer program. This other element can be hardware, for example a memory device, on which the computer program is stored, a hardware key for using the computer program and the like, and/or software, for example a documentation or a software key for using the computer program.

The image processing may be performed on any image data but in certain examples may be performed on medical image data representing a medical image. For example, the image may be acquired by a medical imaging device selected from the group consisting of an X-ray fluoroscopy device, a computed tomography device, a magnetic resonance imaging device, a molecular imaging device, a SPECT-device, a PET-device or combinations thereof. The medical imaging device can be, for example, a combination of an imaging modality and a therapy modality, in particular a radiation therapy modality.

Reference is made to the fact that the described methods and the described image processing apparatus are merely preferred example embodiments of the invention and that the invention can be varied by a person skilled in the art, without departing from the scope of the invention provided it is specified by the claims.

The invention will be illustrated below with reference to the accompanying figures using example embodiments. The illustration in the figures is schematic and highly simplified and not necessarily to scale.

BRIEF DESCRIPTION OF THE DRAWINGS

FIG. 2 is a simplified workflow diagram illustrating a method of processing a medical image to remove one or more portions of the image corresponding to bone structures, according to one aspect of the invention; and FIG. 3 is a schematic diagram of a deep learning network suitable for use in a data processing apparatus, according to one aspect of the invention.

DETAILED DESCRIPTION

Figure 1:
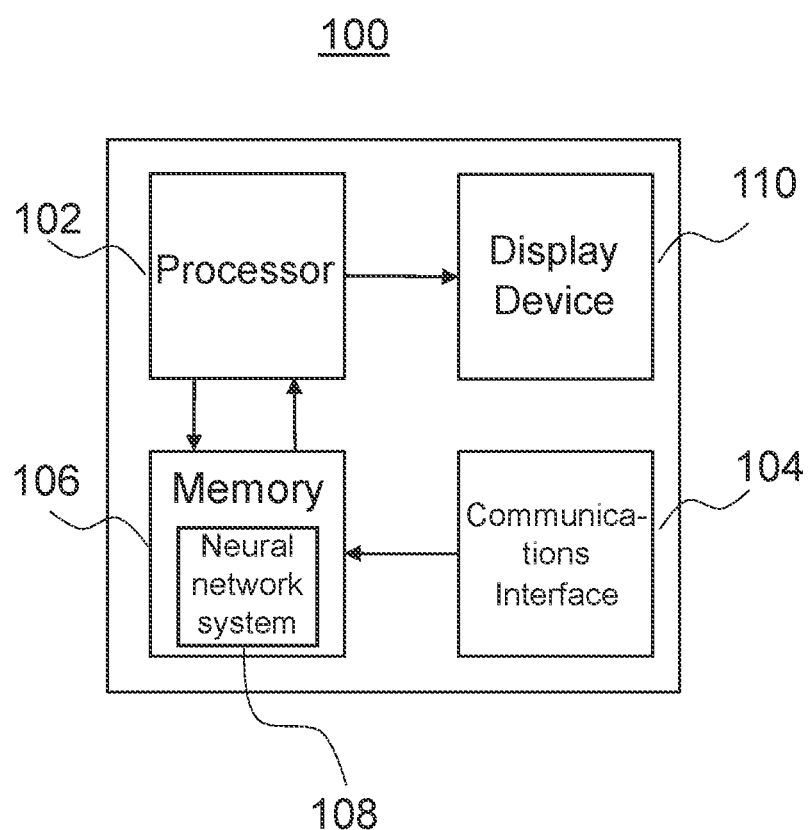
FIG. 1 is a schematic diagram of a data processing apparatus according to one aspect of the invention.

FIG. 1 is a schematic diagram illustrating a data processing apparatus 100 according to an embodiment of the present invention. The data processing apparatus 100 comprises a processor 102 configured to process a medical image to remove one or more portions of the image corresponding to bone structures, according to the methods described herein. The data processing apparatus 100 may, for example, operate on a computing device, such as a workstation, a desktop computer or a laptop computer, or may operate on a server, or may operate in a cloud environment.

The processor 102 may be, for example, a graphics processing unit (GPU) dedicated to processing of image data or may be a component of a central processing unit (CPU) of a computing system, where that component is arranged to process image data.

The data processing apparatus 100 may comprise a communications interface 104 for receiving data, and a memory 106 for storing received data.

The data received at the communications interface 104 may include image data representing the image, metadata associated with the image data (for example, indicating how the image data was acquired), and/or data indicative of one or more image processing algorithms according to which the image data has been processed.

The image data received at the communications interface 104 may, for example, be three-dimensional image data; that is image data capable of being reconstructed by an appropriate reconstruction kernel or algorithm into a three-dimensional image.

The memory 106 may be arranged to store data in the form of a neural network system 108 that may be trained prior to installation and use of the data processing apparatus 100 in an operational setting. The neural network system 108 may be trained using a training set of examples comprising raw image data and corresponding ground truth data in which portions corresponding to bone have been identified and removed, with input from a human operator. The neural network system 108 may, for example, be a convolutional neural network system using deep learning, as described below with reference to FIG. 3.

The memory 106 may also store a computer program executable by the processor 102, to perform the methods described herein, for example the method described below with reference to FIG. 2.

The memory 106, may be any suitable form of memory. For example, the memory 106 may comprise volatile memory, such as random-access memory (RAM) and/or non-volatile memory such as read only memory (ROM) or flash memory. Furthermore, the memory 106 might comprise multiple, separate, memory devices and may comprise a combination of volatile and non-volatile memory. In some examples, certain components of the invention, such as the computer program and/or the neural network system 108, may be stored in one memory device, while other components may be stored in another memory device.

The image may be acquired by a medical imaging device selected from the group consisting of an X-ray fluoroscopy device, a computed tomography device, a magnetic resonance imaging device, a molecular imaging device, a SPECT-device, a PET-device and combinations thereof. The medical imaging device can be, for example, a combination of an imaging modality and a therapy modality, for example a radiation therapy modality.

In some embodiments, the image may be retrieved from a picture archiving and communication system (PACS). For example, the image may be routed to the data processing apparatus 100 using Digital Imaging and Communications in Medicine (DICOM) auto-routing. In some embodiments, the data processing apparatus 100 may be part of an image acquisition system, such as a medical imaging device of the types described above. Alternatively, the data processing apparatus 100 may be separate from the imaging device used to acquire an image and may be retrieved by the data processing apparatus 100 or sent to the data processing apparatus 100 via the communications interface 104.

The processor 102 may be arranged to generate display data based on which an image may be presented on a display device 110. In particular, the processor 102 may be arranged to generate display data, for presentation on the display device 110, corresponding to a medical image from which bone structures have been removed.

FIG. 2 is a flow diagram depicting a method 200 of processing a medical image to remove one or more portions of the image corresponding to bone structures. For example, the method 200 may be implemented by the data processing apparatus 100 described above with reference to FIG. 1.

At block 202, first image data representing a first, three-dimensional, medical image is received. For example, the first image data may be a three-dimensional medical image acquired by, or received from, a medical imaging device such as an X-ray fluoroscopy device, a computed tomography device, a magnetic resonance imaging device a molecular imaging device, a SPECT device, a PET device or combinations thereof.

The first image data may be normalized in order to improve consistency between image processing operations on different sets of image data. For example, the range of pixel or voxel intensity values for an image may be adjusted to conform to a standard range. For example, the processor 102 may process the image to determine a pixel or group of pixels having a highest and/or lowest intensity value and may process the image to adjust the intensity of other pixels in the image to conform to a range of intensities defined between the highest and lowest intensity values.

At block 204, the first image data is processed to generate second image data representing a plurality of two-dimensional image channels each corresponding to a different slice of the first medical image.

At block 206, the second image data is received at a neural network system, such as the neural network system 108 described above with reference to FIG. 1. The neural network system may, for example, be a convolutional neural network system using deep learning, as described below with reference to FIG. 3.

At block 208, an attention mechanism is applied to the second image data to generate an attention map representing one or more regions of interest. For example, the attention mechanism may be arranged to determine, for a plurality of regions of the medical image, an attention measure indicating a degree of mixture of osseous and non-osseous tissue (i.e. bone and soft tissue) and to identify the one or more regions of interest based on the attention measure. The attention map may, for example, comprise higher values in regions of interest compared to other regions of the image. For example, the one or more regions of interest may correspond with regions of the medical image in which there is a high density of both osseous and non-osseous tissue, such as the subclavian region of the human body, where the subclavian arteries are near the clavicle (collar bone).

At block 210, a determination is made, at least partly based on the attention map, that one or more portions of the second image data represent a bone structure. A segmentation process may be performed to categorize certain portions (e.g. voxels) of an image slice as either corresponding to bone or not corresponding to bone. In some examples, the neural network system 108 may be arranged to prioritize identified regions of interest. Such a determination may be made, for example, by the data processing apparatus 100 based on intensity values associated with a given voxel. For example, the data processing apparatus 100 may be determine that a given voxel is more likely to correspond to bone structures if its intensity value exceeds a threshold value, and to not correspond to a bone structure to a bone structure if its intensity value does not exceed that threshold value. Such a threshold value may be determined during a training phase during which the neural network system 108 is trained based on sample image data (comprising images containing portions where bone structures are present) and corresponding ground truth data (identifying portions of the image data corresponding to bone structures).

The neural network system 300 may be trained prior to installation in an operational setting by providing, to the neural network system 300, training data comprising training images and corresponding ground truth data representing bone structure segmentation masks for the training images. For example, the neural network system 300 may be trained with a Leaky rectifier linear unit (Leaky ReLU) providing activation functions.

Each training image is a three-dimensional medical image, and in some embodiments, the training images may be three-dimensional computed tomography (CT) volumes. In other embodiments, the training images may be contrast-enhanced CT volumes. In other embodiments, the training images may be three-dimensional magnetic resonance (MR) images or three-dimensional medical images acquired using other medical imaging modalities, such as ultrasound, positron emission tomography (PET), etc.

The training process may substantially correspond with the method 200 described above with reference to FIG. 2. The training process may, in particular, be arranged to train the neural network system 300 to focus on image regions in which it is difficult to distinguish between hard and soft tissue. For example, the neural network system 300 may be trained to identify areas of the image, such as particular regions of interest in which it is difficult to distinguish between hard and soft tissue, to improve efficiency of the image processing resources. For example, during training of the neural network system 300, a loss function may be used which provides higher rewards for correct or accurate identification in regions for which it is determined that it is difficult to distinguish between hard and soft tissue (i.e. regions of interest), and conversely higher losses for incorrect or inaccurate identification in regions for which it is determined that it is difficult to distinguish between hard and soft tissue. For example, the attention mechanism may be arranged to learn which regions are more difficult on the basis mistakes from analyses of those regions during the training process, which are reflected in the calculation provided by the loss function. In one example, the loss function may comprise a binary cross entropy function in which regions of the image with over 123 Hounsfield Units are masked.

The neural network system 300 may be arranged to preferentially apply processing resources to areas of the image in which a shape and/or size and/or position of a bone structure is similar to a shape and/or size and/or position of a soft tissue structure. For example, in respect of the clavicle (more commonly known as the collar bone) there are blood vessels that follow closely the line or trajectory of the clavicle (the so-called sub-clavian vessels). Accordingly, such vessels may be particularly difficult to distinguish from bone structures and therefore the neural network system 300 may provide additional resources to remove bone structures from images of such a region.

In some embodiments, voxels with an intensity value below a certain threshold may be disregarded for the purposes of improved processing of the image. For example, the data processing apparatus 100 may be arranged to disregard any voxel having an intensity value below 123 Hounsfield Units.

In some embodiments, the method 200 may comprise generating a mask comprising regions which have been determined to correspond with bone structures (i.e. based on an estimate of the likelihood that a region comprises bone structures) and regions which have been determined to not correspond with bone structures (i.e. based on an estimate of the likelihood that a region does not comprise bone structures). Such masks can then be applied to raw image data to aid in removal of bone structures and/or to help to visualize underlying, nearby or surrounding soft tissue.

In some embodiments, output data indicating the determined one or more portions of the second image data may be outputted from the neural network system. For example, received three dimensional-image data and the output data may be processed to generate image data representing a medical image in which one or more portions of the first medical image determined to represent a bone structure are removed.

FIG. 3 is a schematic diagram illustrating a neural network system 300 suitable for implementing the method 200 described above with reference to FIG. 2, arranged to receive three-dimensional image data (IMG) 302.

The neural network system 300 comprises a series of convolutional network layers that are connected by functional operations that act on the image data 302.

In the example shown in FIG. 3, image data 302 is received by the neural network system 300. The image data 302 is three-dimensional image data comprising height ($H_1$), width ($W_1$) and depth ($D_1$) dimensions. In the present invention, rather than the height dimension corresponding to the height of the image, it instead corresponds with a number of consecutive two-dimensional slices, as described above with reference to FIG. 2. For example, the height dimension may be set to 16 bits (corresponding to a thickness of a slice) and each slice may be passed through the neural network system in a sliding window-type operation.

The image data is processed by the convolutional neural network in a series of network elements separated by processing steps. The processing steps include convolutions 304, max-pooling operations 306 and up-sampling processes 308. The max-pooling operations 306 comprise a down-sampling process performed on the image or features by taking the maximum value over a specified kernel size, and an up-sampling process to expand the size of image of features by a specified scale through interpolation.

The neural network system 300 also comprises so-called skip connections 310, in which non-adjacent layers in the network are connected skipping the layers in-between.

The neural network system 300 also generates gating signals 312 based on values generated within the neural network system 300 that are used to influence the output of the neural network system 300. The values of the gating signals are typically between 0 and 1 and are used as multipliers to adjust the generated features.

The neural network system 300 comprises concatenation stages 314 in which features generated from a previous layer are stacked with the features generated from the last layer on the feature channel dimension through the skip connection 310.

The neural network system 300 includes attention gates 316 which provide a mechanism (referred to hereinafter as an attention mechanism) for dedicating processing resources to particular areas of the image, such as particular regions of interest, to improve efficiency of the image processing resources. For example, the neural network system 300 may be arranged to preferentially apply processing resources to areas of the image in which a shape and/or size and/or position of a bone structure is similar to a shape and/or size and/or position of a soft tissue structure. For example, in respect of the clavicle (more commonly known as the collar bone) there are blood vessels that follow closely the line or trajectory of the clavicle (the so-called sub-clavian vessels). Accordingly, such vessels may be particularly difficult to distinguish from bone structures and therefore the neural network system 300 may provide additional resources to remove bone structures from images of such a region.

The output of the neural network system 300 described above with reference to FIG. 3 may be a bone segmentation (SEG) 318, which can be applied to an image to perform a bone removal process to provide an image in which bone structures are removed.

According to the method 200 described above with reference to FIG. 2, instead of directly using a three-dimensional neural network system for three-dimensional image segmentation, three-dimensional image data is processed into multi-channel two-dimensional image data and applied to a two-dimensional convolutional neural network system. Dividing the three-dimensional data into slices in this way enables a two-dimensional neural network system, such as the neural network system 300 described above to be used to process data, which in turn avoids excessive use of processing resources e.g. excessive load on the data processing apparatus 100, while providing the capability to retain contextual information from the three-dimensional image data. This may be particularly advantageous in the context of removing bone structures from images, which may require large volumes of data (for example, data corresponding to a whole body of a patient) to be processed. In such cases, it may be impractical without exceeding available processing resources (e.g. processor memory size) to process a sufficiently large volume of data if using a three-dimensional neural network.

The above-described embodiments may provide advantages over conventional methods of processing image data. In particular, by receiving the multi-channel two-dimensional slices at the two-dimensional convolutional neural network system sequentially (for example, from a slice representing a top portion of a patient towards a slice representing a bottom portion of a patient), a complete three-dimensional bone segmentation can be derived by the two-dimensional neural network system operating on the multi-channel, two-dimensional image data. Accordingly, in contrast to a system that receives three-dimensional image data and processes that image data by applying it to a neural network system that applies three-dimensional convolutions, the method 200 described above with reference to FIG. 2 may capture spatial context in-plane to discriminate bone from vessels, while retaining continuity along the caudal-cranial axis by learning density relationships across multiple two-dimensional channels.

While the invention has been illustrated and described in detail with the help of a preferred embodiment, the invention is not limited to the disclosed examples. Other variations can be deducted by those skilled in the art without leaving the scope of protection of the claimed invention.

What is claimed is:

1. A method of processing a medical image to remove one or more portions of the image corresponding to bone structures, the method comprising:
   receiving first image data representing a first, three-dimensional, medical image;
   processing the first image data to generate second image data representing a plurality of two-dimensional image channels each corresponding to a different slice of the first medical image;
   receiving the second image data at a neural network system;
   generating, at the neural network system, an attention map based on the second image data, the attention map including an attention measure indicating a degree of mixture of osseous and non-osseous tissue for identifying one or more regions of interest of the second image data; and
   determining, at least partly on the basis of the attention map, that one or more portions of the second image data represent a bone structure.

2. The method of claim 1, wherein the neural network system is arranged to prioritize the one or more regions of interest based on a similarity measure determined on the basis of at least one of a shape, size, and position of bone structure and at least one corresponding shape, size, and position of soft tissue structure.

3. The method of claim 1, further comprising:
   outputting, from the neural network system, output data indicating the determined one or more portions of the second image data.

4. The method of claim 3, further comprising:
   processing the first image data and the output data to generate third image data representing a second medical image in which one or more portions of the first medical image determined to represent the bone structure are removed.

5. The method of claim 1, wherein the neural network system comprises a deep neural network.

6. The method of claim 5, wherein the deep neural network comprises one or more convolution neural networks.

7. The method of claim 1, wherein the neural network system is arranged to perform a down-sampling process on the second image data.

8. The method of claim 1, wherein determining that one or more portions of the second image data represent a bone structure comprises:
   classifying voxels of the three-dimensional medical image as bone or non-bone voxels.

9. A data processing system for processing a medical image to remove one or more portions of the image corresponding to bone structures, the data processing system comprising a processor arranged to:
   receive first image data representing a first, three-dimensional, medical image;
   process the first image data to generate second image data representing a plurality of two-dimensional image channels each corresponding to a different slice of the first medical image;
   provide the second image data to a neural network system;
   generate, at the neural network system, an attention map based on the second image data, the attention map including an attention measure indicating a degree of mixture of osseous and non-osseous tissue for identifying one or more regions of interest of the second image data; and
   determine, at least partly on the basis of the attention map, one or more portions of the second image data that represent a bone structure.

10. The data processing system of claim 9, wherein the neural network system is arranged to prioritize the one or more regions of interest.

11. A non-transitory computer readable medium comprising a computer program, the computer program being loadable into a memory unit of a data processing system, the computer program including program code sections to make the data processing system execute, when the computer program is executed in the data processing system, operations comprising:
    receiving first image data representing a first, three-dimensional, medical image;
    processing the first image data to generate second image data representing a plurality of two-dimensional image channels each corresponding to a different slice of the first medical image;
    receiving the second image data at a neural network system;
    generating, at the neural network system, an attention map based on the second image data, the attention map including an attention measure indicating a degree of mixture of osseous and non-osseous tissue for identifying one or more regions of interest of the second image data; and
    determining, at least partly on the basis of the attention map, that one or more portions of the second image data represent a bone structure.

12. The non-transitory computer readable medium of claim 11, wherein the neural network system is arranged to prioritize the one or more regions of interest based on a similarity measure determined on the basis of at least one of a shape, a size, and a position of bone structure and at least one corresponding shape, size, and position of soft tissue structure.

13. The non-transitory computer readable medium of claim 11, the operations further comprising:
    outputting, from the neural network system, output data indicating the determined one or more portions of the second image data.

14. The non-transitory computer readable medium of claim 13, the operations further comprising:
    processing the first image data and the output data to generate third image data representing a second medical image in which one or more portions of the first medical image determined to represent the bone structure are removed.

15. The non-transitory computer readable medium of claim 11, wherein the neural network system comprises a deep neural network.

16. The non-transitory computer readable medium of claim 15, wherein the deep neural network comprises one or more convolution neural networks.

17. The non-transitory computer readable medium of claim 11, wherein the neural network system is arranged to perform a down-sampling process on the second image data.

\* \* \* \* \*